United States Patent
Montemurro et al.

(10) Patent No.: US 11,295,617 B2
(45) Date of Patent: Apr. 5, 2022

(54) METHOD AND SYSTEM FOR WIRELESS ROAD SIDE UNITS

(71) Applicant: BlackBerry Limited, Waterloo (CA)

(72) Inventors: Michael Peter Montemurro, Toronto (CA); Stephen McCann, Southampton (GB); Adrian Buckley, Tracy, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/165,385

(22) Filed: Oct. 19, 2018

(65) Prior Publication Data
US 2020/0126416 A1    Apr. 23, 2020

(51) Int. Cl.
| | | |
|---|---|---|
| *G08G 1/0967* | (2006.01) | |
| *H04L 29/08* | (2006.01) | |
| *H04L 67/12* | (2022.01) | |

(52) U.S. Cl.
CPC ........ *G08G 1/096783* (2013.01); *H04L 67/12* (2013.01)

(58) Field of Classification Search
CPC ........ G08G 1/096783; G08G 1/096791; H04L 67/12
See application file for complete search history.

(56) References Cited

U.S. PATENT DOCUMENTS

| | | | |
|---|---|---|---|
| 9,693,297 B2 | 6/2017 | Condeixa et al. | |
| 2002/0150050 A1* | 10/2002 | Nathanson | G07C 5/008 370/241 |
| 2008/0136670 A1* | 6/2008 | Tengler | G08G 1/20 340/905 |
| 2014/0226567 A1* | 8/2014 | Sakata | G08G 1/0112 370/328 |
| 2016/0323233 A1* | 11/2016 | Song | G06Q 50/30 |
| 2017/0085437 A1 | 3/2017 | Condeixa et al. | |
| 2017/0324817 A1 | 11/2017 | Oliveira et al. | |
| 2017/0347367 A1* | 11/2017 | Tandai | H04W 4/70 |
| 2018/0176742 A1* | 6/2018 | Narayanan | G08G 1/096775 |
| 2018/0188738 A1* | 7/2018 | Tatourian | G05D 1/0234 |
| 2018/0194352 A1* | 7/2018 | Avedisov | B60W 30/16 |

(Continued)

FOREIGN PATENT DOCUMENTS

| | | |
|---|---|---|
| WO | 2011025809 A1 | 3/2011 |
| WO | 2017164838 A1 | 9/2017 |
| WO | 2017189035 A1 | 11/2017 |

OTHER PUBLICATIONS

3GPP TS 31.103 V15.2.0; 3rd Generation Partnership Project; Technical Specification Group Core Network and Terminals; Characteristics of the IP Multimedia Services Identity Module (ISIM) Application; Release 15; Apr. 2018; 52 pages.

(Continued)

*Primary Examiner* — Mohamed Barakat
(74) *Attorney, Agent, or Firm* — Conley Rose, P.C.; J. Robert Brown, Jr.

(57) ABSTRACT

A method at a computing device within an Intelligent Transportation System, the method including detecting a traffic event at the computing device; determining no fixed roadside unit is available from the computing device; establishing an Internet Protocol connection from the computing device to a network node; and sending a traffic event message from the computing device to the network node, the traffic event message providing information for the traffic event.

17 Claims, 6 Drawing Sheets

(56) References Cited

U.S. PATENT DOCUMENTS

2018/0206089 A1* 7/2018 Cavalcanti ...... H04W 36/00837
2018/0212867 A1* 7/2018 Norp ..................... H04L 45/304
2019/0044738 A1* 2/2019 Liu ....................... H04L 9/3268
2019/0297526 A1* 9/2019 Das ......................... H04W 4/06

OTHER PUBLICATIONS

British Standards; "Road Transport and Traffic Telematics—Dedicated Short-Range Communication—Physical Layer Using Microwave at 5.8 GHz"; BS EN 12253:2004; Jul. 29, 2004; 20 pages.
ETSI EN 302 665 V1.1.1; Intelligent Transport Systems (ITS); Communications Architecture; Sep. 2010; 44 pages.
ETSI TS 101 220 V11.0.0; Smart Cards; ETSI Numbering System for Telecommunication Application Providers; Release 11; Jun. 2011; 35 pages.
ETSI TS 102 221 V8.2.0; Smart Cards; UICC—Terminal Interface; Physical and Logical Characteristics; Release 8; Jun. 2009; 174 pages.
European Extended Search Report; Application No. 19199398.9; dated Feb. 20, 2020; 8 pages.

* cited by examiner

METHOD AND SYSTEM FOR WIRELESS ROAD SIDE UNITS

FIELD OF THE DISCLOSURE

The present disclosure relates to traffic management, and in particular relates to road side units in traffic management.

BACKGROUND

Intelligent Transport Systems (ITS) are systems in which a plurality of devices communicate to allow for the transportation system to make better informed decisions with regard to transportation and traffic management, as well as allowing for safer and more coordinated decision-making. ITS system components may be provided within vehicles, as part of the fixed infrastructure or Road Side Units (RSUs), such as on bridges or at intersections, and for other users of the transportation systems, including vulnerable road users such as pedestrians or bicyclists.

ITS system deployment is receiving significant focus in many markets around the world, with radio frequency bands being allocated for the communications. In addition to the vehicle to vehicle communications for safety critical and non-critical applications, further enhancements to provide systems or applications are being developed for vehicle to infrastructure and vehicle to portable scenarios.

RSUs can be used to send messages to traffic management operations centers to allow actions to be taken upon the occurrence of specific events. For example, such events may include accidents in or near the roadway, snow or weather-related events, maintenance events such as damage to roadways or debris on roadways, among other events. Deploying RSUs in urban environments and along primary roadways is an effective way to obtain event information. However, deploying RSUs on secondary roads or in rural areas can be cost prohibitive due to lack of infrastructure.

BRIEF DESCRIPTION OF THE DRAWINGS

The present disclosure will be better understood with reference to the drawings, in which.

DETAILED DESCRIPTION OF THE DRAWINGS

Figure 1:
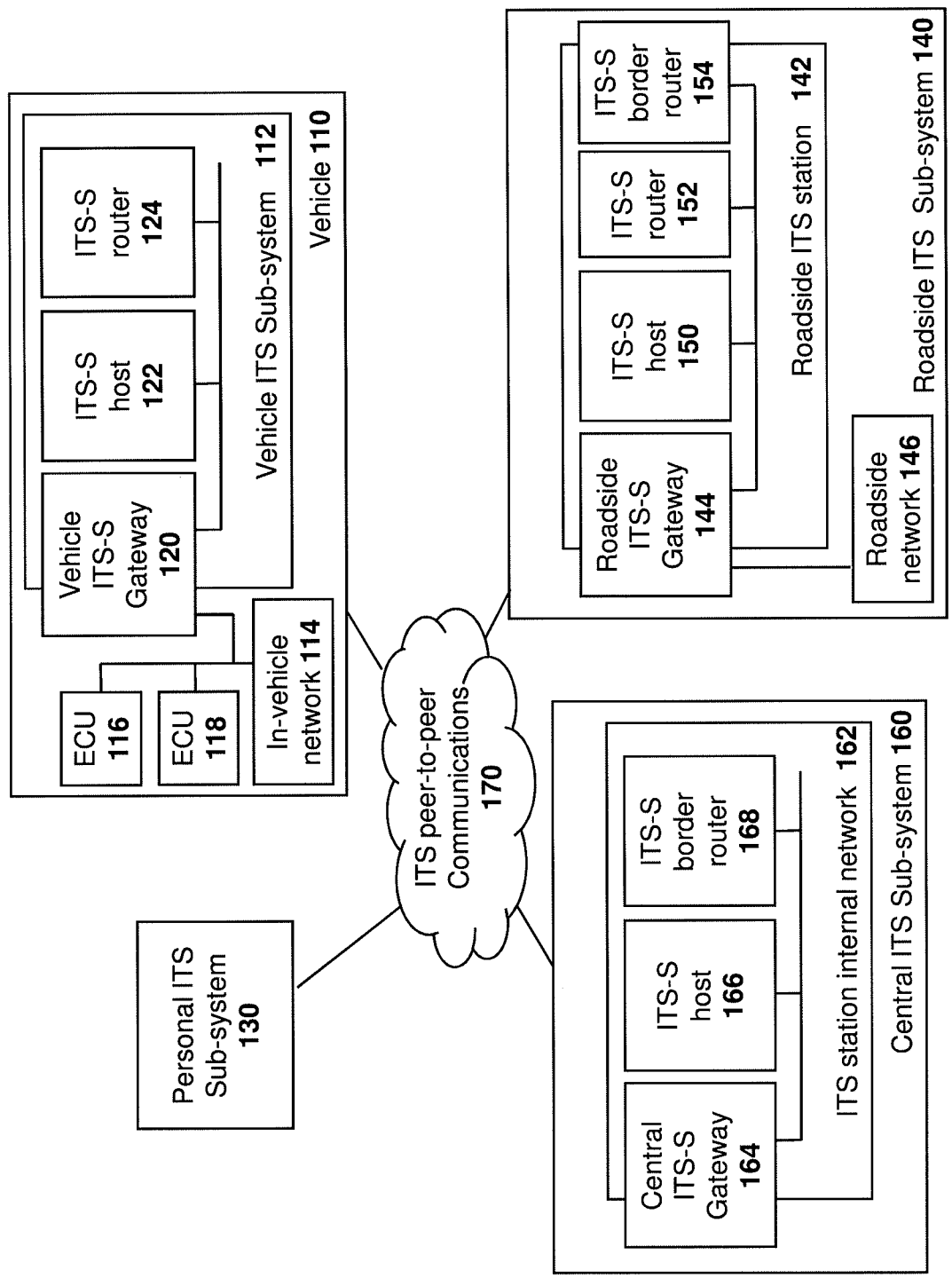
FIG. 1 is a block diagram of an Intelligent Transportation System (ITS)

The present disclosure provides a method at a computing device within an Intelligent Transportation System, the method comprising: detecting a traffic event at the computing device; determining no fixed roadside unit is available from the computing device; establishing an Internet Protocol connection from the computing device to a network node; and sending a traffic event message from the computing device to the network node, the traffic event message providing information for the traffic event.

The present disclosure further provides a computing device within an Intelligent Transportation System, the computing device comprising: a processor; and a communications subsystem, wherein the computing device is configured to: detect a traffic event at the computing device; determine no fixed roadside unit is available from the computing device; establish an Internet Protocol connection from the computing device to a network node; and send a traffic event message from the computing device to the network node, the traffic event message providing information for the traffic event.

The present disclosure further provides a computer readable medium for storing instruction code which, when executed by a processor of a computing device within an Intelligent Transportation System cause the computing device to: detect a traffic event at the computing device; determine no fixed roadside unit is available from the computing device; establish an Internet Protocol connection from the computing device to a network node; and send a traffic event message from the computing device to the network node, the traffic event message providing information for the traffic event.

In the present disclosure, the terms in Table 1 below may be used:

TABLE 1

| Terms | |
|---|---|
| Term | Brief Description |
| Location | Information about location, such as the geographic region. |
| Location Information | Set of Global Navigation Satellite System (GNSS) co-ordinates such as the Global Positioning System (GPS) co-ordinates, Cell ID, Location Area, Routing Area, Tracking Area, Public Land Mobile Network (PLMN) identifier, waypoint, address, etc. |
| Universal Integrated Circuit Card (UICC) | A UICC is the smart card used, for example, in mobile terminals in Global System for Mobile Communications (GSM) and Universal Mobile Terrestrial System (UMTS) networks. A UICC information may be either on a removal module or in internal memory. A UICC contains applications, credentials or profiles that are used by the Vehicle (e.g. User Equipment (UE)). Some known applications are UICC Subscriber Identity Module (USIM), Internet Protocol (IP) Multimedia Subsystem (ISM) Subscriber Identity Module (ISIM), among others. |
| Public User ID | An identity that is known to the public. For example, a Mobile Subscriber Integrated Services Digital Network Number (MSISDN), email address, Session Initiation Protocol (SIP) Universal Resource Identifier (URI) or Tel URI. |
| Private user ID | An identity that is only known to the network and the device. For example, an International Mobile Subscriber Identity (IMSI) or SIP URI. |
| User Identity | Can be either or both Public User ID and/or Private user ID. The identity could be represented by any character or group of characters. |
| Traffic Event | A condition on the road that may affect traffic behavior. Traffic events are detected when a series of sensor events or Basic Safety Messages (BSMs) are received within a subscribed period in time. Examples of traffic events include but are not limited to: accidents, road work, obstacles impeding traffic flow on a |

TABLE 1-continued

Terms

| Term | Brief Description |
|---|---|
| | roadway, or a local weather event such as icy road conditions. |

ITS software and communication systems are designed to enhance road safety and road traffic efficiency. Such systems include vehicle to/from vehicle (V2V) communications, vehicle to/from infrastructure (V2I) communications, vehicle to/from network (V2N) communications, and vehicle to/from pedestrian or portable (V2P) communications. The communications from a vehicle to/from any of the above may be generally referred to as V2X. Further, other elements may communicate with each other. Thus, systems may include portable to/from infrastructure (P2I) communications, infrastructure to infrastructure (I2I) communications, portable to portable (P2P) communications, among others.

Such communications allow the components of the transportation system to communicate with each other. For example, vehicles on a highway may communicate with each other, allowing a first vehicle to send a message to one or more other vehicles to indicate that it is braking, thereby allowing vehicles to follow each other more closely.

Communications may further allow for potential collision detection and/or avoidance, and allow a vehicle with such a device to take action to avoid a collision, such as braking and/or steering, or accelerating and/or steering. Such communications may be useful for autonomous vehicles in some cases. In other cases, an active safety system on a vehicle may take input from sensors such as cameras, RADAR, LIDAR, and V2X, and may act on them by steering or braking, overriding or augmenting the actions of the human driver. Another type of advanced driver assistance system (ADAS) is a passive safety system that provides warning signals to a human driver to take actions. Both active and passive safety ADAS systems may take input from V2X and ITS systems.

In other cases, fixed infrastructure may give an alert to approaching vehicles that they are about to enter a dangerous intersection or alert vehicles to other vehicles or pedestrians approaching the intersection. The alert may also signal approaching hazards such as debris on the roadway, a collision ahead, adverse weather conditions, among other options. This alert can include the state of signals at the intersection (signal phase and timing (SPaT)) as well as position of vehicles or pedestrians or hazards in the intersection. Other examples of ITS communications would be known to those skilled in the art.

Reference is now made to FIG. 1, which shows one example of an ITS station, as described in the European Telecommunications Standards Institute (ETSI) European Standard (EN) 302665, "Intelligent Transport Systems (ITS); communications architecture", as for example provided for in version 1.1.1, September 2010.

In the embodiment of FIG. 1, a vehicle 110 includes a vehicle ITS sub-system 112. Vehicle ITS sub-system 112 may, in some cases, communicate with an in-vehicle network 114. The in-vehicle network 114 may receive inputs from various electronic control units (ECUs) 116 or 118 in the environment of FIG. 1.

Vehicle ITS sub-system 112 may include a vehicle ITS Station (ITS-S) gateway 120 which provides functionality to connect to the in-vehicle network 114.

Vehicle ITS sub-system 112 may further have an ITS-S host 122 which contains ITS applications and functionality needed for such ITS applications.

Further, an ITS-S router 124 provides the functionality to interconnect different ITS protocol stacks, for example at layer 3 of the ITS Communications (ITSC) Open Systems Interconnection (OSI) protocol stack. ITS-S router 124 may be capable of converting protocols, for example for the ITS-S host 122. As provided in ETSCI EN 302665, protocols may include a GeoNetworking protocol, IPv6 networking with mobility support developed at IETF and ISO, IPv6 over GeoNetworking, CALM FAST protocol, other ways of IPv6 networking, among other protocols. Each networking protocol may be connected to a specified dedicated ITSC transport protocol or may connect to an already existing transport protocol, such as UDP, TCP. IPv6 networking comprises methods to enable interoperability with legacy IPv5 systems.

Further, the ITS system of FIG. 1 may include a personal ITS sub-system 130, which may provide application and communication functionalities of ITS communications (ITSC) in handheld or portable devices, such as personal digital assistants (PDAs), mobile phones, user equipment, among other such devices.

A further component of the ITS system shown in the example of FIG. 1 includes a roadside ITS sub-system 140, also referred to herein as an RSU, which may contain roadside ITS stations and interceptors such as on bridges, traffic lights, among other options.

The roadside sub-system 140 includes a roadside ITS station 142 which includes a roadside ITS-S gateway 144. Such gateway may connect the roadside ITS station 142 with proprietary roadside networks 146.

A roadside ITS station may further include an ITS-S host 150 which contains ITS-S applications and the functionalities needed for such applications.

The roadside ITS station 142 may further include an ITS-S router 152, which provides the interconnection of different ITS protocol stacks, for example at layer 3.

The ITS station 142 may further include an ITS-S border router 154, which may provide for the interconnection of two protocol stacks, but in this case with an external network.

A further component of the ITS system in the example of FIG. 1 includes a central ITS sub-system 160 which includes a central ITS station internal network 162.

The ITS station internal network 162 includes a central ITS-S gateway 164, a central ITS-S host 166 and a ITS-S border router 168. ITS-S gateway 164, central ITS-S host 166 and ITS-S border router 168 have similar functionality to the gateway 144, ITS-S host 150 and ITS-S border router 154 of the roadside ITS station 142.

Communications between the various components may occur through a ITS peer-to-peer communications network 170.

The system of FIG. 1 is however merely one example of an ITS system.

From FIG. 1 above, V2X communications may be used for road safety, for improving efficiency of road transportation, including movement of vehicles, reduced fuel consumption, among other factors, or for other information exchange.

V2X messages that are defined by the European Telecommunications Standards Institute (ETSI) currently fall into two categories, namely Cooperative Awareness Message (CAM) ($1^{st}$ message set) and Decentralized Environmental Notification Message (DENM) ($2^{nd}$ message set). A CAM message is a periodic, time triggered message which may provide status information to neighboring ITS stations. The broadcast is typically transported over a single hop and the status information may include one or more of a station type, position, speed, and heading, among other options. Optional fields in a CAM message may include one or more of information to indicate whether the ITS station is associated with roadworks, rescue vehicles, or a vehicle transporting dangerous goods, among other such information.

Typically, a CAM message is transmitted between 1 and 10 times per second.

A DENM message is an event triggered message that is sent only when a trigger condition is met. For example, such a trigger may be a road hazard or an abnormal traffic condition. A DENM message is broadcast to an assigned relevance area via geo-networking. It may be transported over several wireless hops and event information may include one or more of details about the causing event, detection time, event position, event speed and heading, among other factors. DENM messages may be sent, for example, up to 20 times per second over a duration of several seconds.

Similar concepts apply to the Dedicated Short Range Communications (DSRC)/Wireless Access In Vehicular Environments (WAVE) system in which a Basic Safety Message (BSM) is specified in addition to or instead of the CAM/DENM messaging. Specifically, for V2X safety applications, BSMs are broadcast by each vehicle and are received by vehicles in range and also RSUs. The information is used to ensure that neighboring vehicles have more time to identify and react to a traffic event. Examples of traffic events include collisions, broken down cars, road maintenance and emergency vehicles present, among other options.

RSUs receive information from vehicles and can make use of the network to broadcast information on traffic events or other conditions that affect traffic flow to other vehicles that are not in range of the BSM transmission from the originating vehicle. This traffic event information can be used to modify traffic flow and ensure safety of other vehicles on the road when a traffic event occurs.

Road Side Units

RSUs can be used to send messages to traffic management operation centers so that actions can be taken upon specific events. Messages may provide information such as, for example, that an accident has occurred, that snow has fallen, that roadway maintenance is required, among other information. As indicated above, deploying RSUs in urban environments and along primary roadways is a cost-effective solution because infrastructure is available. However, deploying RSUs on secondary roads in rural areas can be more costly due to lack of infrastructure. Thus, the ubiquitous deployment of RSUs to cover all roadways can be costly in rural environments, where appropriate network infrastructure may not be available.

However, vehicles or other electronic devices have the capability to transmit BSMs, regardless of whether RSUs are present.

The trend toward connected cars and ITSs ensures that at least a subset of vehicles on the road have IP connectivity through cellular or possibly in other access technologies such as Wireless Local Area Network (WLAN). If a vehicle or other similar electronic device has IP connectivity (e.g. Internet connectivity) and a traffic event occurs in an area where there are no RSUs, in accordance with the embodiments herein, the electronic may act as an RSU and transmit traffic information through the IP connection such as through the Internet or another dedicated IP network connection.

As used herein, a traditional RSU that is connected to infrastructure components and provides a static RSU for ITS users will be called a first type RSU. This first type RSU may be fixed and long lived in time. A second type RSU may be an RSU that temporarily provides RSU functionality. For example, the second type RSU may be a vehicle, construction sign, or other similar electronic device. In some cases, the second type RSU may be mobile. Thus, a second type RSU may be considered a "virtual RSU" or a "wireless RSU". Functionality of a second type RSU may include providing credentials and authorization to communicate with the Traffic Management Gateway; geolocation information on where the vehicle is permitted to operate as a second type RSU; and the list of messages (or message categories) that the second type RSU is permitted to send to the Traffic Management Gateway.

Figure 2:
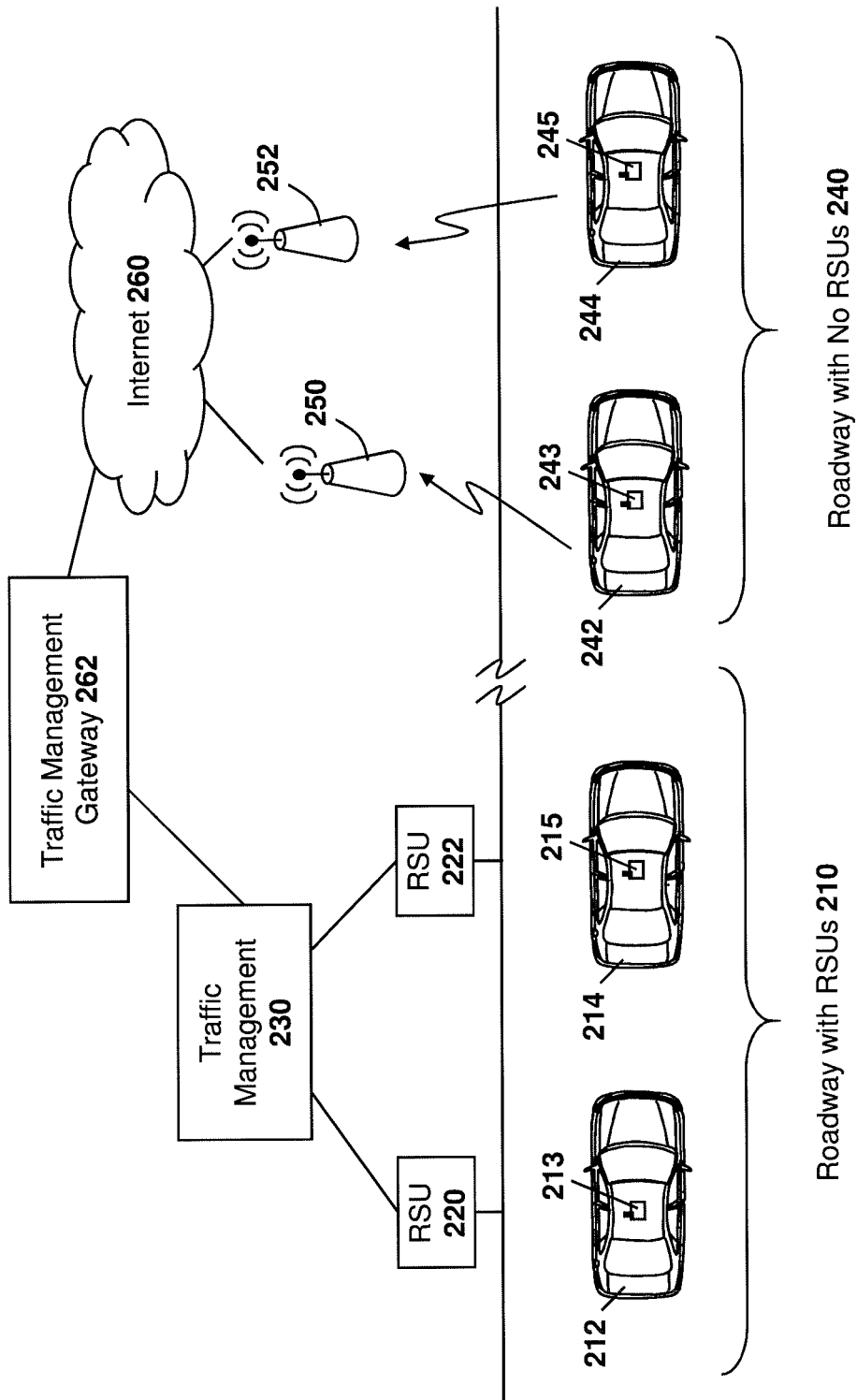
FIG. 2 is a block diagram showing a topology for communications with a traffic management entity for roadways with and without RSUs.

For example, reference is now made to FIG. 2, which shows an example network topology for traffic management. In the embodiment of FIG. 2, computing devices associated with vehicles exchange traffic safety messages, regardless of whether a first type RSU is available or not.

When first type RSUs are available, RSU deployments are networked to provide information on traffic management through a traffic management application.

When first type RSUs are not available, a traffic management gateway is a network node which allows electronic devices to communicate with the traffic management application through an IP connection such as the Internet. The connectivity between the electronic device and the traffic management gateway could be through a cellular network or through another access network such as a Wi-Fi network, a TV Whitespace network, or any other network technology.

Thus, in the embodiment of FIG. 2, a roadway with first type RSUs 210 includes an electronic device such as vehicle 212 and vehicle 214. Each of the vehicle 212 and vehicle 214 is equipped with a computing device, namely computing device 213 and 215 respectively, capable of providing BSMs to an RSU such as first type RSU 220 or first type RSU 222.

First type RSUs 220 and 222 communicate with a traffic management application 230, which is a network node used for traffic management.

Conversely, a roadway with no RSU 240 is shown having electronic devices such as vehicles 242 and 244. As with vehicles 212 and 214, vehicles 242 and 244 each have a computing device 243 and 245 which is capable of sending BSMs. However, at least one of vehicles 242 and 244 is also capable of communicating with an IP network. For example, the communications may be between computing device 243 and/or computing device 245 with an access point 250 or a cellular tower 252 in some cases.

In accordance with the embodiments of the present disclosure, the communications may then be provided through a wide area network such as the Internet 260 as shown or another IP connection (e.g. dedicated IP network) and through a traffic management gateway 262 to the traffic management application 230.

In the embodiments described below, in some cases computing device 243 or computing device 245 on vehicle 242 or vehicle 244 may act as a relay for vehicles that are not equipped to send IP messages. Further, in some cases computing device 243 or computing device 245 may act as a relay for communications from the other vehicle, even if that other vehicle or electronic device is capable of communicating through the IP network. For example, this may be done to limit the amount of IP traffic sent over the network by enabling only a subset of vehicles as second type RSUs.

Further, in some cases, the type of information that is provided by a second type RSU may only consist of a subset of the BSMs. For example, in order to limit the amount of data and not overwhelm the cellular network, only messages which are within a defined subset of messages or that meet the criteria in a policy in the sending device (e.g. car) may be provided back to the traffic management application 230. The defined subset of messages may be preconfigured or may be provisioned to the computing device.

Further, the electronic devices acting as a second type RSU may, in some cases, be configured by the traffic management application 230 to act as an RSU on an as needed basis. For example, if an accident is detected, then more vehicles may be configured to act as second type RSUs in order to provide greater coverage of the accident. Other examples are possible.

Further, in some cases, rather than a vehicle acting as a second type RSU, other elements within the roadway may be configured to be the virtual RSU. For example, temporary construction signs, devices associated with roadworks, or other similar devices may be adapted to become a second type RSU.

In the case of an event or other situation in which an RSU needs to temporarily be added to the road network, a second type RSU may be configured to be attached to other permanent infrastructure on the roadway. Such second type RSU is described in the embodiment of FIG. 5 below.

Reporting Traffic Events

Figure 3:
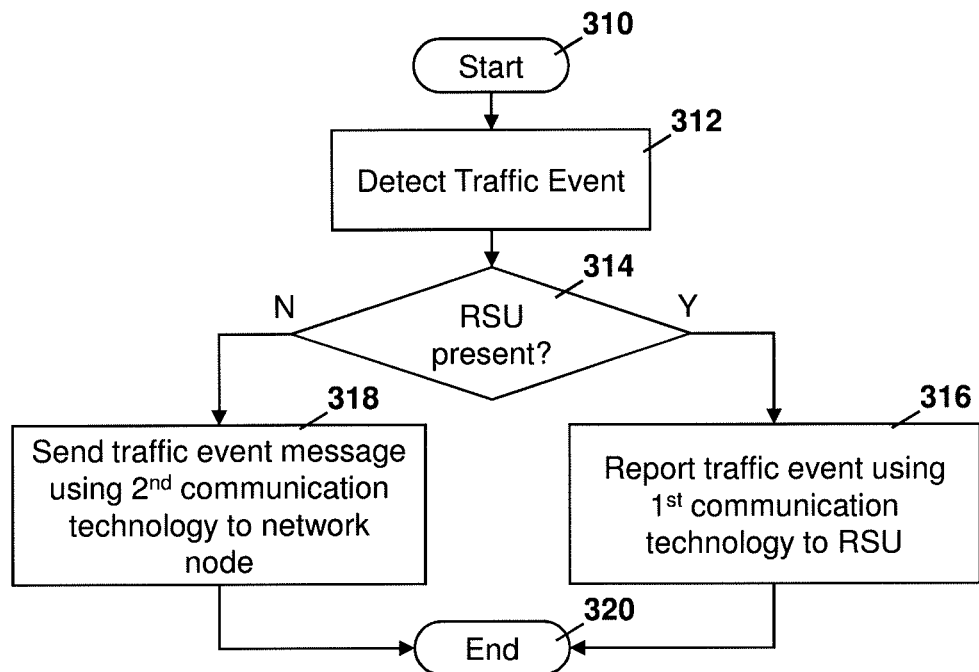
FIG. 3 is a process diagram showing a process of sending traffic management events depending on the presence of an RSU.

Utilizing the topology of FIG. 2, in accordance with one embodiment of the present disclosure, traffic events may be reported as shown in FIG. 3. While the embodiment of FIG. 3 is described with regard to a computing device on a vehicle, the present disclosure is not limited to communications from vehicles, and a second type RSU could be any electronic device, including electronic devices affixed to or associated with infrastructure such as construction equipment, a mobile sign, a fixed building on a roadway, a fixed structure on a roadway, among other options.

The process of FIG. 3 starts at block 310 and proceeds to block 312. An electronic device may monitor to determine whether a traffic event has occurred. Specifically, the electronic device may be configured either at the time of manufacture or subsequently with a set of rules defined to identify a traffic event. Each traffic event would have a set of conditions based on sensor measurements and received BSM messages.

For example, in one embodiment, traffic event rules may be defined by a traffic management authority and may be provisioned to the electronic device.

Therefore, in accordance with the embodiment of FIG. 3, a traffic event meeting provisioned or configured criteria at the electronic device is detected at block 312.

The process then proceeds to block 314 in which a check is made to determine whether an RSU is present. In particular, an electronic device may actively monitor during operation whether an RSU is present or not. Such monitoring may be based on whether the electronic device receives messages transmitted by an RSU over a first technology. For example, the first technology could be a Dedicated Short Range Communication (DSRC), as for example defined by the European Committee for Standardization (CEN) EN 12253:2004 *"Dedicated Short Range Communication-Physical Layer Using Microwave at 5.8 GHz"*. However, the *present disclosure is not limited to DSRC and of the first technology could be any technology on which an RSU transmits.*

In some cases, the monitoring of whether an RSU is present could involve setting a threshold time for receiving updates, messages or beacon signals from an RSU.

As will be appreciated, while an RSU may not be present in rural areas, other situations may lead to an RSU not being present. For example determination at block 314 could also be used in cases for backup access, when an RSU is either broken or has gone down such as due to a power outage, or when an existing RSU is fully loaded with other data traffic. For example, an overloaded RSU may be under congestion situations that may be determined by RSU broadcasting a message that indicates a load or congestion status or the vehicle may determine that the number of messages that are destined for the RSU has exceeded a threshold, the threshold may have been provisioned within the computing device. In any of these cases, the check at block 314 may also find that the RSU is not present.

If, at block 314, it is determined that an RSU is present, the process proceeds to block 316 in which the traffic event is reported to the RSU utilizing that the first technology, as is typically done in current ITS systems. The RSU would then provide the traffic event to a traffic management entity such as traffic management application 230 from FIG. 2.

Conversely, if no RSU is present, as determined at block 314, then the process proceeds to block 318. At block 318, an electronic device may transmit a traffic event message to a network node over a second technology. The transmission may, for example, utilize an IP connection such as an Internet connection and the network node may be a traffic monitoring gateway such as traffic monitoring gateway 262 from FIG. 2.

The transmission at block 318 may be preceded by the setup of an IP connection. In this case, an IP address for the network node such as the traffic management gateway could be configured or provisioned to the electronic device. The electronic device may then send a V2I/N message to the network node address that was provisioned. In other cases, the network node address may be derived from a fully qualified domain name (FQDN) resolution.

In some embodiments, access to the network element such as that the traffic management gateway may be provisioned to the electronic device. Thus, for example, a certificate may be provided to the electronic device to post messages to the network element in order to ensure the legitimacy of the message. In other cases, the ability to post messages to the network element in order to ensure the legitimacy of the message may be provided in other ways to the electronic device.

The second technology could be cellular or could be an alternative wireless access technology such as WLAN. Thus, the electronic behaves as though there is a second type RSU as an access point to the Internet.

From block 316 or block 318, the process may then proceed to block 320 and end.

A network node such as a traffic management gateway may react to received traffic events in various ways. In one case, the network node may distribute the information to nearby vehicles. In some cases, the network node may provide communication back to the electronic device providing the traffic event. In some cases, the network node may provision one or more electronic devices to either act as second type RSUs, stop acting as second type RSUs, provide new event reporting conditions or time thresholds, among other options. Thus, from a network node perspective, reference is now made to FIG. 4.

Figure 4:
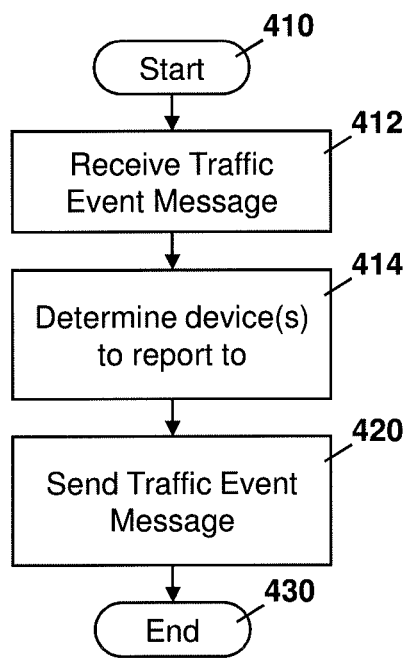
FIG. 4 is a process diagram for a network element to provide traffic event messages.

The process of FIG. 4 starts at block 410 and proceeds to block 412 in which the network node receives a traffic event message. For example, the traffic event message may be the message that is sent at block 318 of FIG. 3.

The process then proceeds to block 414 in which the network node may determine which electronic devices to provide a report to. The report may be provided, for example, based on a location of the electronic devices, and limit the forwarding of the report to those electronic devices in the vicinity of the traffic event. Further, in some cases, the electronic devices to which the report is provided may be based on information within the traffic event message. Additionally, or alternatively, the electronic device selected at block 414 may include the electronic device that send the original traffic event message. Thus, the message may be sent in an unsolicited manner or in response to the transmission from the electronic device.

Once the one or more electronic devices are selected at block 414, the process may then proceed to block 420 in which a traffic event message may be provided by the network node to the selected electronic devices.

The process then proceeds to block 430 and ends.

The traffic event message of blocks 318 and 420 from FIGS. 3 and 4 above may consist of a variety of information.

In one embodiment, the traffic event message may include information on a type of event. For example, this information may include whether an accident has occurred, whether the event as a weather condition, whether road maintenance is required, among other similar information.

In some cases, the traffic event message may include a timestamp when the event is triggered by the vehicle transmitting the event.

Further, in some embodiments, the traffic event message may also include a location of the event.

The traffic event message may, in some cases, include relevant information that was collected from a BSM that triggered the event. For example, wheel slip information on icy roads may be provided in the traffic event message.

The traffic event message could be based on information from sensors on the electronic device acting as the second type RSU or could be based on information received from other electronic devices to the second type RSU.

In some cases, all of the above information could be included in a traffic event message. In other cases, a subset of the above information could be included in the traffic event message. In further cases, other information besides the above information can also be included in the traffic event message.

Further, the traffic event message sent in the uplink from the electronic device to the network element may be different than a traffic event message sent in the downlink from the network element to the one or more selected electronic devices.

In some embodiments, all message is transmitted to and from the network element would be protected for authenticity, data confidentiality and replay protection. This would ensure the legitimacy of the messages in each direction.

Further, electronic devices could be provisioned with authorization and authentication information to permit them to act as a second type RSU. This authorization information can be used to advertise second type RSU capabilities in messages to other nearby electronic devices. In this way, the electronic device may act as a second type RSU not only for information received from its own sensors, but also received through BSMs from other nearby electronic devices. The authentication information could be used to establish secure conductivity with network elements such as the traffic management gateway.

Further, second type RSUs could operate in conjunction with first type RSUs, in the same electronic device at the same time. Indeed, message and data can be relayed by the electronic device from a first to a second type RSU if such communications are perceived to be needed within the network.

An electronic device may receive a message over a first or second communication technology, which changes or modifies traffic events that should be transmitted over the opposing technology. For example, a message may be received over the first technology that results in the transmission over the second technology.

Messages received by electronic devices over the second technology may be received via various means, including point to point such as through Long Term Evolution (LTE), Next-Generation (Ng) Uu interfaces, among others. In other cases, the messages may be received via broadcast, for example through a Multimedia Broadband Multicast Service (MBMS) or an equivalent next-generation technology.

While the above is described with regard to vehicles, in some cases a virtual RSU may be any other fixed or mobile station. In this regard, the embodiments of FIG. 3 or 4 could be utilized with a typology such as that described with regard to FIG. 5.

Figure 5:
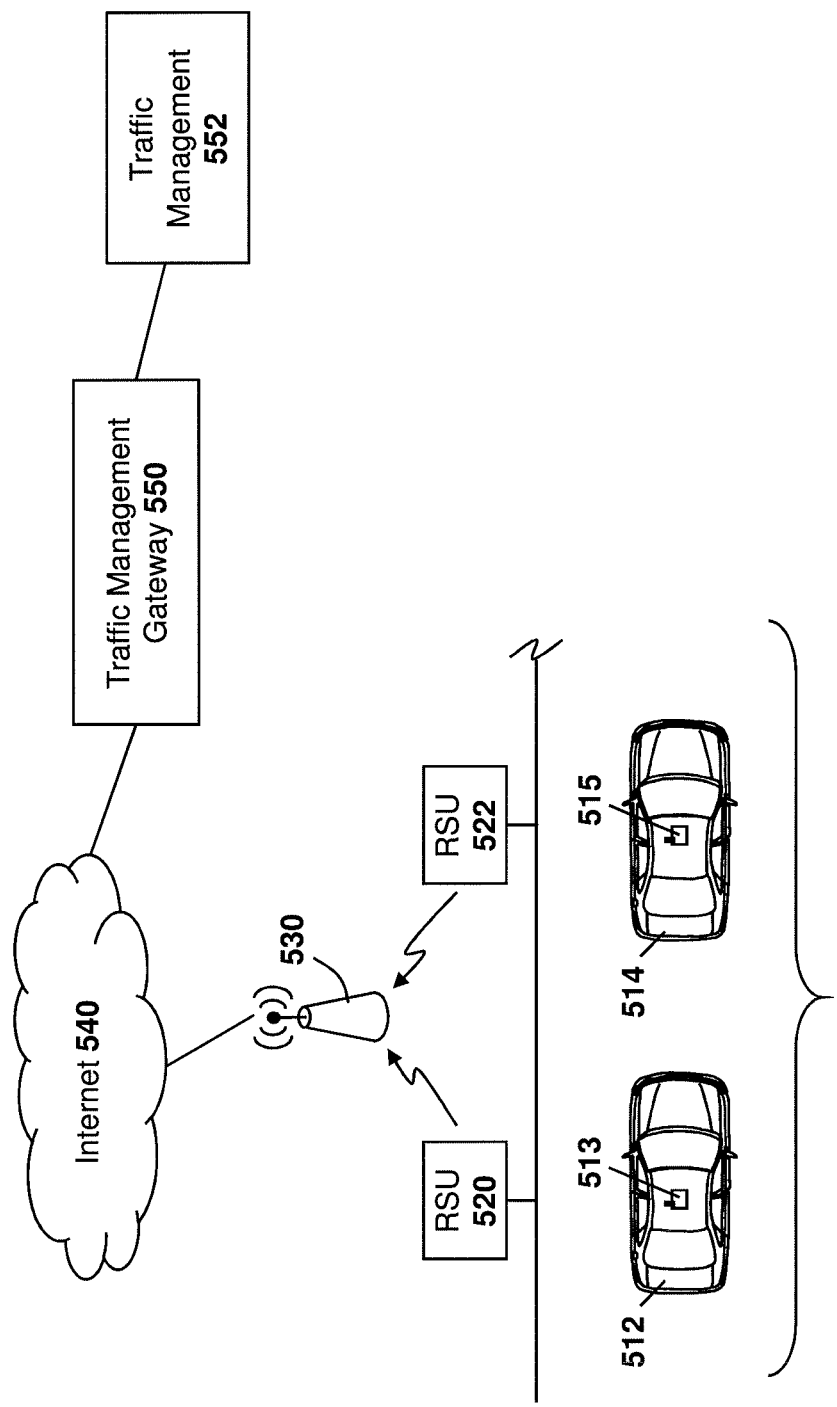
FIG. 5 is a block diagram showing an alternate topology in with road side units are wireless.

Referring to the embodiment of FIG. 5, a roadway 510 with a second type RSU is shown. On the roadway, an electronic device such as a vehicle 512 includes a computing device 513 capable of communicating with an RSU. The roadway further consists of a device 513 having a computing device 515 also capable of communicating with the RSU.

Two second type RSUs, namely RSU 520 and RSU 522 are shown in the embodiment of FIG. 5. Such RSUs communicate, for example wirelessly, with an access point 530. Such wireless communications can be cellular, Wi-Fi, among other options.

The traffic may be routed through a network such as Internet 542 to a traffic management gateway 550. The traffic may then be routed to a traffic management entity 552.

In this case, the second type RSUs 520 and 522 may be provisioned with information that is to be provided over the wireless link and may further filter events to determine whether they meet the criteria provisioned at the RSU. In this case, the entity performing the process of FIG. 3 would be RSU 520 or RSU 522.

Further, information used to establish an IP connection with the traffic management gateway 550 may be provisioned to the RSUs.

The typology of FIG. 5 allows for the RSUs themselves to be mobile and be placed on moving vehicles. It further allows the RSUs to be temporarily installed on infrastructure or other roadway elements.

Provisioning

Various information may be provisioned to an electronic device acting as a second type RSU. This may include information on the type of event that is to be reported. The information provisioned may also include authorization and authentication information to allow the second type RSU to act as an RSU and to further communicate with a network element such as a traffic management gateway. IP connection information may also be provisioned.

Provisioned information may be stored in a variety of locations. In one embodiment, the provisioned information may be stored in a universal integrated circuit card (UICC) or on a UICC application.

In other cases, provisioned information may be stored in device memory.

In still further cases, information that is provisioned to the device may be stored in on external memory and accessed, for example, through a communication subsystem on the computing device.

Further, in some cases, the provisioned information can be stored in two or more of the above locations, either as a duplication or broken into various components.

The information may be pre-provisioned on the electronic device at any time prior to deployment of the device. In other cases, provisioning may occur after the device has been deployed.

Provisioning could be point-to-point data. For example, this may be done through a Short Message Service (SMS), Unstructured Supplementary Service Data (USSD), IP datagram, Hypertext Transfer Protocol (HTTP), eXtensible Markup Language (XML) Configuration Access Protocol (XCAP), among other options.

Provisioning could also be done through broadcast data such as through MBMS, system information, cell broadcast, among other options.

Provisioning could also be done through control messages such as through a Non-Access Stratum (NAS) message, V2X message, V2X application message, among other options.

Figure 6:
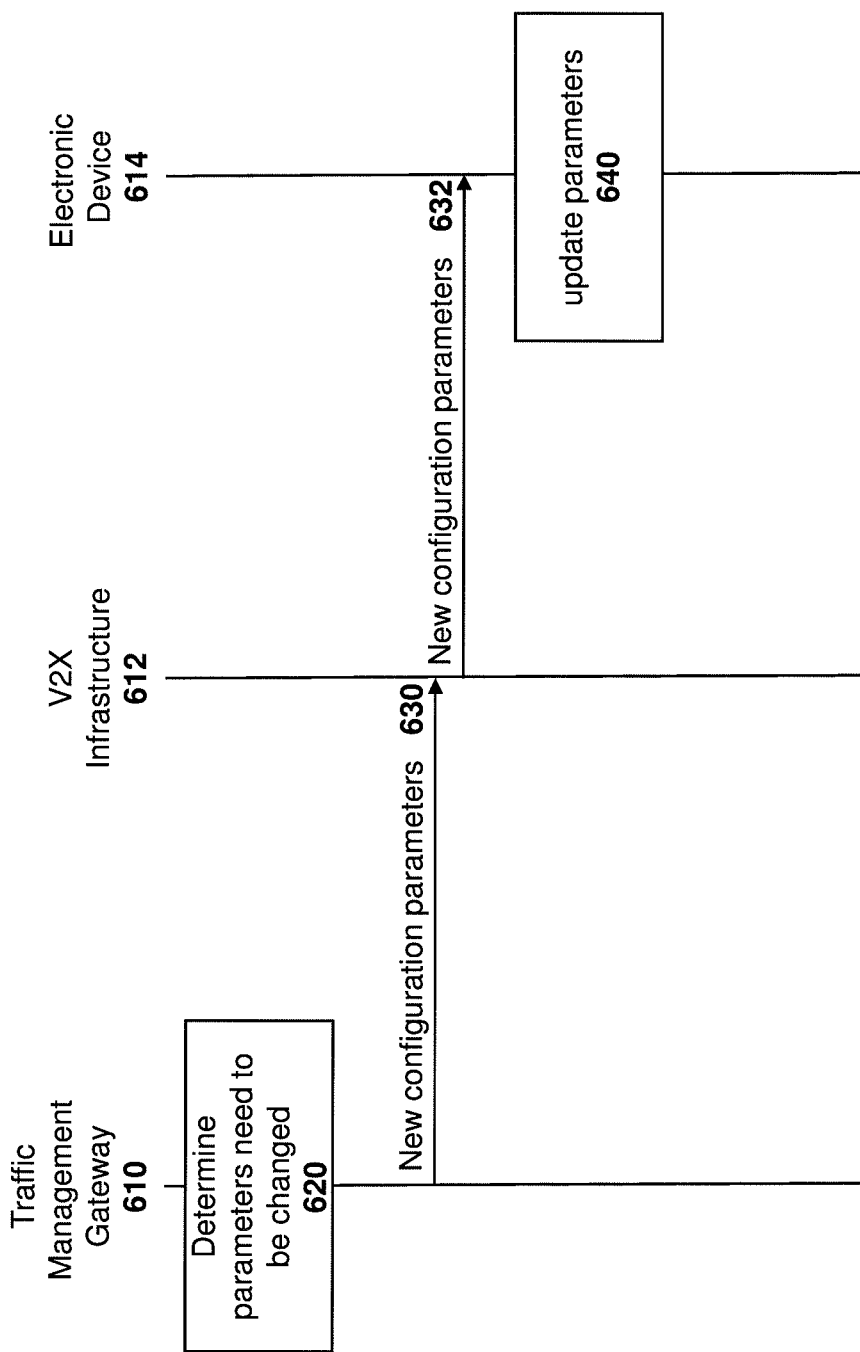
FIG. 6 is dataflow diagram showing provisioning of parameters at a computing device acting as a virtual road side unit.

If a network node such as the traffic management service decides that configuration information in an electronic device needs to be changed then the provisioning information may be supplied to the electronic device. For example, referring to FIG. 3, if at block 318 a message was sent from the electronic device to the traffic management gateway indicating that a weather condition exists such as snow, sleet or rain, then the traffic management service may decide that more information is needed. For example, the information may need to be updated more frequently than current configuration parameters. In this case, the service may transmit a message to the electronic device. Reference is now made to FIG. 6.

In the embodiment of FIG. 6, a network node such as a traffic management gateway 610 may communicate with a network element such as a V2X infrastructure 612. Further, the V2X infrastructure 612 make interact with an electronic device 614, for example through a cellular communication link.

The traffic management gateway 610 may determine that configuration parameters need to be changed within an electronic device, as seen at block 620. For example, this may be based on traffic events received, distribution of vehicles on a highway, a time duration since the last report was received, among other options.

The traffic management gateway 610 may then send message 630 containing new configuration parameters to the V2X infrastructure 612. Each new configuration parameters may include, for example, a reporting frequency, or traffic event parameters or definitions, IP configuration information, authorization or authentication credentials, among other options.

The V2X infrastructure 612 receives message 630 and forwards the message as message 632 to electronic device 614.

Electronic device 614 may receive message 632 and update its provisioned parameters. For example, the periodic frequency that messages are sent may be updated based on message 632. In other cases, the event definitions may be updated to provide more or less data. Other types of updates may also be performed. The updates are done at block 640 in the embodiment of FIG. 6.

With regard to the embodiment of FIG. 6, the determination at block 620 may be based on a number of factors. Such factors may include, but are not limited to, a distribution of vehicles on the highway. In this instance, the traffic management gateway may determine that cars are spaced at a distance X, and thus may decide a message transmission frequency based on this distance and the number of vehicles.

In other cases, an area without RSUs or with RSU outages may be found and the traffic management service may send a message to activate an electronic device as a second type RSU within this area.

Further, in some cases, information included in traffic events may be used as a basis for the changing of provisioned parameters. For example, road repair that has been reported already may not need to be reported again as frequently.

Other factors for determining that provisioning of configuration information is needed are possible.

Using Subscription Information

In a further aspect of the present disclosure, subscription information may be distinguished for messages that are sent from second type RSU from data that would otherwise be associated with a particular user. Specifically, sending data to the cellular network or other licensed or specialize networks is typically charged by an operator. Therefore, in one embodiment, a V2X messages or a traffic event messages may be easily identified and distinguished from other traffic.

Such networks may either advertise that they may incur a charge or subscription data, provisioned on the electronic device, could set up a bearer in the network that can be identified by the network for billing purposes.

The billing costs may also depend on which messages are sent. For example, some BSMs may be sent for free, while other types messages may incur a charge.

Various types of subscription data can be provisioned in an electronic device. For example, one or more of the following could optionally be provisioned:

Location information

The address of the Traffic Management Gateway

Technology that could be used to send the V2X messages on, such as for example 5G, LTE, Global System for Mobile communication (GSM) Edge Radio Access Network (GERAN), Universal Terrestrial Radio Access Network (UTRAN), among other options.

Access credentials (e.g. APN, Username, Password, Certificate, FQDN, IP address, etc.). For example, the APN may be used for setting up the bearer with optional username and password FQDN to determine Traffic Management Gateway address; or IP address of the Traffic Management Gateway Quality of service (QoS) to request for the IP connection Type of transport to be used e.g. IP, non IP Network slice identity Subscription data e.g. user identity, UICC identity, UICC application identity (e.g. AID)

Criteria for detection whether an RSU is present. This information could include, but is not limited to, an RSU received traffic threshold for a particular location Traffic events that should be transmitted over the $2^{nd}$ technology Traffic events frequency that the Traffic event should be sent. This may be on a per Traffic Event basis or for all Traffic events. Frequency could be:

Distance travelled;

Time between message

Absolute times

Further, if a V2X application decides to use a second technology for sending the V2X messages, the V2X application may determine if a UICC application identifier (AID) has been provisioned.

For example, the Third Generation Partnership Project (3GPP) Technical Specification (TS) 31.103, *"Characteristics of the IP Multimedia Services Identity Module (ISIM) application"*, v.15.2.0, Apr. 2018, provides for ISIM application selection in section 5.1.1.1. In particular, when a device, user equipment or terminal initializes and decides that it needs to select a UICC application or instance or profile, the device will look at the $EF_{DIR}$ file and select an application from that file.

The $EF_{DIR}$ file contains a list of application identifiers and associated label strings. These are, for example, found in the European Telecommunications Standards Institute (ETSI) TS 102 221, *"Smart Cards; UICC-Terminal interface; Physical and logical characteristics (Release 8)"*, v. 8.2.0, June 2009.

An AID has two components. The first is a "registered application provider identifier" (RID), which is five bytes in length. The second is a "proprietary application identifier extension" (PIX), which is up to 11 bytes in length.

The RID identifies 3GPP and its value in coding may be "A00000087". The PIX identifies the application such as the USIM, ISIM, among others, with the last two characters being available for "application provider specific data". The AID is standardized in the ETSI TS 101 220, *"Smart Cards; ETSI numbering system for telecommunication application providers (Release 11)"*, v. 11.0.0, June 2011.

Thus, in one embodiment, a dedicated UICC application may be used for V2X messages.

In another embodiment, the V2X application may determine if there are any access credentials provisioned at the electronic device. Such provisioning may occur, for example, in accordance with any of the above embodiments. The V2X application may then use any or all of the access credentials to set up an IP connection. Such IP connection may, for example, be a Packet Data Protocol (PDP) or a Packet Data Network (PDN) context using an Access Point Name (APN) and optionally including a username and password. After establishing an IP connection, the address of the network node such as the traffic management gateway could be done using a fully qualified domain name or a provisioned IP address.

Such bearer or IP connection setup may be done, for example, if an AID for an application is not present in some cases.

The embodiments described above can be applied to any type of moving vehicle (boats, trains, airplanes, pedestrians). Traffic Management Gateways and second type RSUs can also be located on moving vehicles themselves, together with static locations including railroad (railway) infrastructure, piers, jetties, buoys, satellite stations etc.

Another area of application is within the healthcare business where Traffic Management Gateways and second type RSUs may be located in healthcare premises and vehicles are sensors attached to patients.

In another aspect of the present disclosure, in emergency situations all communications network described above may have a prioritization system to enable the transmission of emergency messages in preference to non-emergency messages. Messages can have a classification to indicate whether they are emergency, safety critical or otherwise.

The electronic device associated with any network element such as an RSU, traffic management element, traffic management gateway, or traffic management service, as well as an electronic device associated with a vehicle, road user or pedestrian, may be any computing device. One simplified diagram of a computing device is shown with regard to FIG. 7.

Figure 7:
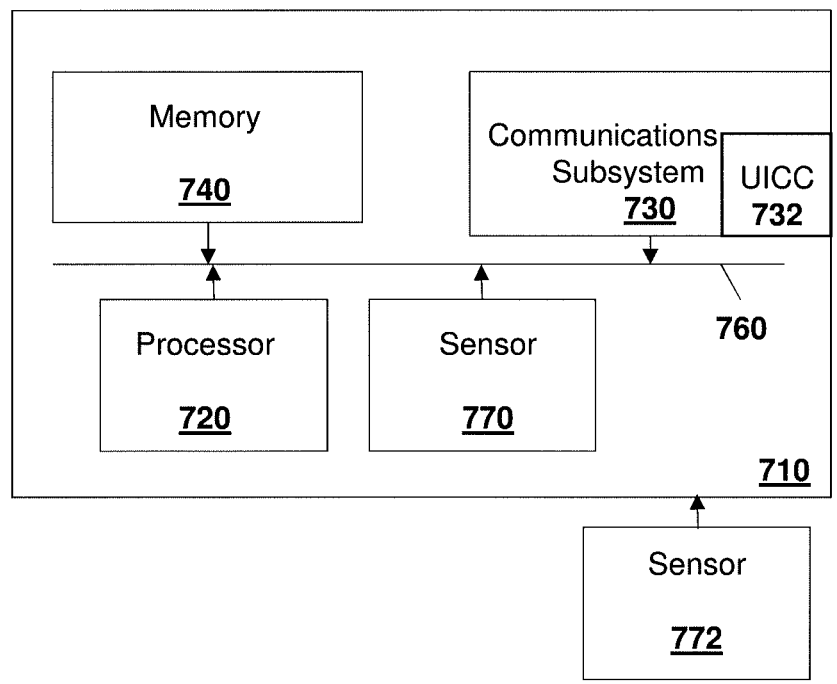
FIG. 7 is a block diagram of a simplified computing device capable of being used with the present embodiments.

In FIG. 7, computing device 710 includes a processor 720 and a communications subsystem 730, where the processor 720 and communications subsystem 730 cooperate to perform the methods of the embodiments described above.

Communications subsystem 730 allows computing device 710 to communicate with other devices or network elements. Communications subsystem 730 may use one or more of a variety of communications types, including but not limited to cellular, satellite, Bluetooth™, Bluetooth™ Low Energy, Wi-Fi, wireless local area network (WLAN), near field communications (NFC), IEEE 802.15, DSRC, Whitespace, wired connections such as Ethernet or fiber, among other options.

As such, a communications subsystem 730 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 730 will be dependent upon the communication network or communication technology on which the computing device is intended to operate.

If communications subsystem 730 includes a cellular subsystem, a UICC 732 may be part of the communications subsystem. UICC 732 may store Application Identifiers as described above.

Communications subsystem 730 may, in some embodiments, comprise multiple subsystems, for example for different radio technologies.

Processor 720 is configured to execute programmable logic, which may be stored, along with data, on device 710, and shown in the example of FIG. 7 as memory 740. Memory 740 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 740, device 710 may access data or programmable logic from an external storage medium, for example through communications subsystem 730.

Communications between the various elements of device 710 may be through an internal bus 760 in one embodiment. However, other forms of communication are possible.

Internal sensors 770 or external sensors 772 may provide data to the computing device 710, but are optional elements. Such sensors may include positioning sensors, LIDAR, RADAR, image sensors such as cameras, orientation sensors, temperature sensors, vibration sensors, among other options.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for CDN to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device within an Intelligent Transportation System, the method comprising:
   detecting a traffic event at the computing device;
   determining no fixed roadside unit is available from the computing device;
   upon determining that no fixed roadside unit is available, establishing an Internet Protocol connection from the computing device to a network node;
   sending a traffic event message from the computing device to the network node, the traffic event message providing information for the traffic event;
   based on the sending, receiving a reconfiguration message, the reconfiguration message reconfiguring at least one of: traffic event parameters; traffic event reporting frequency; authentication parameters; authorization parameters; an address of the network node; or enabling or disabling the sending of traffic events; and
   sending a second traffic event message, the second traffic event message being configured based on the reconfiguration message.

2. The method of claim 1, wherein the detecting is based on parameters provisioned at the computing device.

3. The method of claim 1, wherein the detecting is based on a Basic Safety Message received from a second computing device.

4. The method of claim 1, wherein the determining no fixed roadside unit is available is based on a message from the fixed roadside unit indicating the fixed roadside unit has no capacity for further messages.

5. The method of claim 1, wherein the determining no fixed roadside unit is available is based on a configuration parameter at the computing device.

6. The method of claim 1, wherein the configuration message contains traffic event parameters, the traffic event parameters defining which traffic events to send a traffic event message for.

7. The method of claim 1, wherein the detecting uses a first radio technology and the sending uses a second radio technology.

8. The method of claim 1, wherein the network node is a traffic management gateway.

9. A computing device within an Intelligent Transportation System, the computing device comprising:
   a processor; and
   a communications subsystem,
   wherein the computing device is configured to:

detect a traffic event at the computing device;
determine no fixed roadside unit is available from the computing device;
upon determining that no fixed roadside unit is available, establish an Internet Protocol connection from the computing device to a network node;
send a traffic event message from the computing device to the network node, the traffic event message providing information for the traffic event;
based on the sending, receive a reconfiguration message, the reconfiguration message reconfiguring at least one of: traffic event parameters; traffic event reporting frequency; authentication parameters; authorization parameters; an address of the network node; or enabling or disabling the sending of traffic events; and
send a second traffic event message, the second traffic event message being configured based on the reconfiguration message.

10. The computing device of claim 9, wherein the computing device is configured to detect based on parameters provisioned at the computing device.

11. The computing device of claim 9, wherein the computing device is configured to detect based on a Basic Safety Message received from a second computing device.

12. The computing device of claim 9, wherein the computing device is configured to determine no fixed roadside unit is available based on a message from the fixed roadside unit indicating the fixed roadside unit has no capacity for further messages.

13. The computing device of claim 9, wherein the computing device is configured to determine no fixed roadside unit is available based on a configuration parameter at the computing device.

14. The computing device of claim 9, wherein the configuration message contains traffic event parameters, the traffic event parameters defining which traffic events to send a traffic event message for.

15. The computing device of claim 9, wherein the computing device is configured to detect using a first radio technology and send using a second radio technology.

16. The computing device of claim 9, wherein the network node is a traffic management gateway.

17. A non-transitory computer readable medium for storing instruction code which, when executed by a processor of a computing device within an Intelligent Transportation System cause the computing device to:
detect a traffic event at the computing device;
determine no fixed roadside unit is available from the computing device;
upon determining that no fixed roadside unit is available, establish an Internet Protocol connection from the computing device to a network node;
send a traffic event message from the computing device to the network node, the traffic event message providing information for the traffic event;
based on the sending, receive a reconfiguration message, the reconfiguration message reconfiguring at least one of: traffic event parameters; traffic event reporting frequency; authentication parameters; authorization parameters; an address of the network node; or enabling or disabling the sending of traffic events; and
send a second traffic event message, the second traffic event message being sent based on the reconfiguration message.

* * * * *